United States Patent
Sumiya

(10) Patent No.: US 9,875,768 B2
(45) Date of Patent: Jan. 23, 2018

(54) RECORDING TAPE CARTRIDGE HAVING A REEL THAT INCLUDES A PLURALITY OF THROUGH HOLES FORMED IN A FLANGE THEREOF

(71) Applicant: FUJIFILM CORPORATION, Minato-ku, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 15/490,924

(22) Filed: Apr. 19, 2017

(65) Prior Publication Data

US 2017/0316801 A1 Nov. 2, 2017

(30) Foreign Application Priority Data

Apr. 27, 2016 (JP) .................................. 2016-089483

(51) Int. Cl.
  *G11B 5/78* (2006.01)
  *G11B 15/61* (2006.01)
  *G11B 23/107* (2006.01)

(52) U.S. Cl.
  CPC .............. *G11B 15/615* (2013.01); *G11B 5/78* (2013.01); *G11B 23/107* (2013.01)

(58) Field of Classification Search
  CPC ................................ G11B 5/78; G11B 23/107
  USPC ........................................... 360/132; 242/348
  See application file for complete search history.

(56) References Cited

U.S. PATENT DOCUMENTS

| | | | | |
|---|---|---|---|---|
| 6,411,466 B1* | 6/2002 | Shima | .................. | G11B 23/043 |
| | | | | 242/343.2 |
| 6,954,335 B2* | 10/2005 | Tsuyuki | ............... | G11B 23/044 |
| | | | | 242/343.2 |
| 7,175,123 B2* | 2/2007 | Hiraguchi | ............ | G11B 23/043 |
| | | | | 242/338.1 |
| 2004/0041053 A1* | 3/2004 | Iino | ...................... | G11B 23/044 |
| | | | | 242/348.2 |
| 2005/0061902 A1* | 3/2005 | Sanpei | ................... | G11B 15/67 |
| | | | | 242/348.3 |
| 2008/0259495 A1* | 10/2008 | Ichikawa | ............... | G11B 5/627 |
| | | | | 360/132 |
| 2010/0065671 A1* | 3/2010 | Onmori | ................ | G11B 23/041 |
| | | | | 242/348 |

(Continued)

FOREIGN PATENT DOCUMENTS

JP 2014-186771 A 10/2014

*Primary Examiner* — Jefferson Evans
(74) *Attorney, Agent, or Firm* — SOLARIS Intellectual Property Group, PLLC

(57) ABSTRACT

A recording tape cartridge includes a reel including a reel hub having an outer diameter of an upper end portion which is smaller than that of a lower end portion, and including a lower flange in which plural through holes are radially formed. Inclined surfaces, formed at one edge portion and another edge portion of each of the through holes, are directed toward a flange circumferential direction. The one edge portion is directed in a rotational direction of the reel, when a recording tape is wound on the reel. The other edge portion is directed in the rotational direction when the recording tape is led out of the reel. An inclination angle with respect to a bottom surface of the lower flange of the inclined surface at the one edge portion is smaller than that of the inclined surface of the other edge portion.

4 Claims, 7 Drawing Sheets

(56) References Cited

U.S. PATENT DOCUMENTS

2011/0155836 A1* 6/2011 Mori .................... G11B 23/037
                                                         242/348.2
2011/0168828 A1* 7/2011 Mori .................... G11B 23/043
                                                         242/348.2

* cited by examiner

RECORDING TAPE CARTRIDGE HAVING A REEL THAT INCLUDES A PLURALITY OF THROUGH HOLES FORMED IN A FLANGE THEREOF

CROSS-REFERENCE TO RELATED APPLICATION

This application claims priority under 35 USC 119 from Japanese Patent Application No. 2016-089483 filed Apr. 27, 2016, the disclosure of which is incorporated by reference herein in its entirety.

BACKGROUND OF THE INVENTION

1. Field of the Invention

The present invention relates to a recording tape cartridge of which a single reel on which a recording tape is wound is housed in a case.

2. Description of the Related Art

A single reel, which is housed in a case of a recording tape cartridge and includes a plurality of through holes formed in a flange, is more advantageous than a reel that does not include a plurality of through holes formed in a flange, in terms of a reduction in material cost, which is caused by a reduction in the amount of a material to be used, and a reduction in the drive torque of a drive device and transportation cost that are caused by a reduction in an environmental burden and weight.

However, since the thickness of the flange is not uniform in the reel that includes a plurality of through holes formed in the flange, a deviation of the flange in a height direction, that is, the run-out of the flange is large. For this reason, there is a concern that the behavior of the recording tape may be unstable (the rolling of the recording tape may occur) during the travel of a recording tape in which the reel is rotated.

For this reason, a mold, which is used to mold a reel and in which an inclination angle of a tapered surface of a spoke portion formed between through holes formed in a flange is set to be larger than an inclination angle of a tapered surface of an outer annular region of the flange for the improvement of the traveling stability of a recording tape, has been known in the past (for example, see JP2014-186771A).

SUMMARY OF THE INVENTION

However, when the inclination angle of the tapered surface of the spoke portion between the through holes is set to be larger than the inclination angle of the tapered surface of the outer annular region, an effect of reducing the rolling of the flange in the radial direction can be expected during the travel of a recording tape but it is difficult to expect an effect of reducing the rolling of the flange in the circumferential direction. For this reason, there is a concern that the behavior of the traveling recording tape may become unstable when the recording tape is rewound on the reel.

Accordingly, an object of the invention is to obtain a recording tape cartridge that can stabilize the behavior of a traveling recording tape when the recording tape is rewound on a reel including a plurality of through holes formed in a flange.

In order to achieve the object, a recording tape cartridge according to a first aspect of the invention comprises a reel and a case. The reel includes: a reel hub that is formed in a shape of a bottomed cylinder of which an outer diameter of an upper end portion is smaller than an outer diameter of a lower end portion, the reel hub includes an annular reel gear formed on a lower surface of a bottom portion and meshing with a drive gear of a drive device, and a recording tape is wound on an outer peripheral surface thereof; a lower flange that is integrally formed at an outer side in a radial direction of the bottom portion and in which plural through holes are formed so as to extend in the radial direction, and a first inclined surface is formed at one edge portion and a second inclined surface is formed at another edge portion of each of the plural through holes, the one edge portion and the other edge portion are opposed and are directed to lower flange circumferential directions, and the first inclined surface and the second inclined surface allow a distance in the circumferential direction between the one edge portion and the other edge portion to be shorter at a lower surface of the lower flange than a distance in the circumferential direction between the one edge portion and the other edge portion at an upper surface of the lower flange; and an annular upper flange that is mounted at an upper end portion of the reel hub. The case houses the single reel, and an opening allowing the recording tape to be led out of the reel is formed at the case. An inclination angle of the first inclined surface of the one edge portion with respect to a rotation axis of the reel, the one edge portion is directed in a rotational direction of the reel when the recording tape is wound onto the reel, is larger than an inclination angle of the second inclined surface of the other edge portion, with respect to the rotation axis of the reel, the other edge portion is directed in a rotational direction of the reel when the recording tape is led out of the reel.

Further, a recording tape cartridge according to a second aspect of the invention comprises a reel and a case. The reel includes: a reel hub that is formed in a shape of a bottomed cylinder of which an outer diameter of an upper end portion is smaller than an outer diameter of a lower end portion, the reel hub includes an annular reel gear formed on a lower surface of a bottom portion and meshing with a drive gear of a drive device, and a recording tape is wound on an outer peripheral surface thereof; a lower flange that is integrally formed at an outer side in a radial direction of the bottom portion and in which plural through holes are formed so as to extend in the radial direction, a first inclined surface is formed at one edge portion and a second inclined surface is formed at another edge portion of each of the plural through holes, the one edge portion and the other edge portion are opposed and directed to lower flange circumferential directions, the first inclined surface and the second inclined surface allow a distance in the circumferential direction between the one edge portion and the other edge portion to be shorter at a lower surface of the lower flange than a distance in the circumferential direction between the one edge portion and the other edge portion at an upper surface of the lower flange; and an annular upper flange that is mounted at an upper end portion of the reel hub. The case houses the single reel, and an opening allowing the recording tape to be led out of the reel is formed at the case. An area of the first inclined surface of the one edge portion, the one edge portion is directed in a rotational direction of the reel when the recording tape is wound onto the reel, is larger than an area of the second inclined surface of the other edge portion, the other edge portion is directed in a rotational direction of the reel when the recording tape is led out of the reel.

According to the invention, it is possible to stabilize the behavior of a traveling recording tape when the recording tape is rewound on a reel including a plurality of through holes formed in a flange.

DESCRIPTION OF THE PREFERRED EMBODIMENTS

Figure 1:
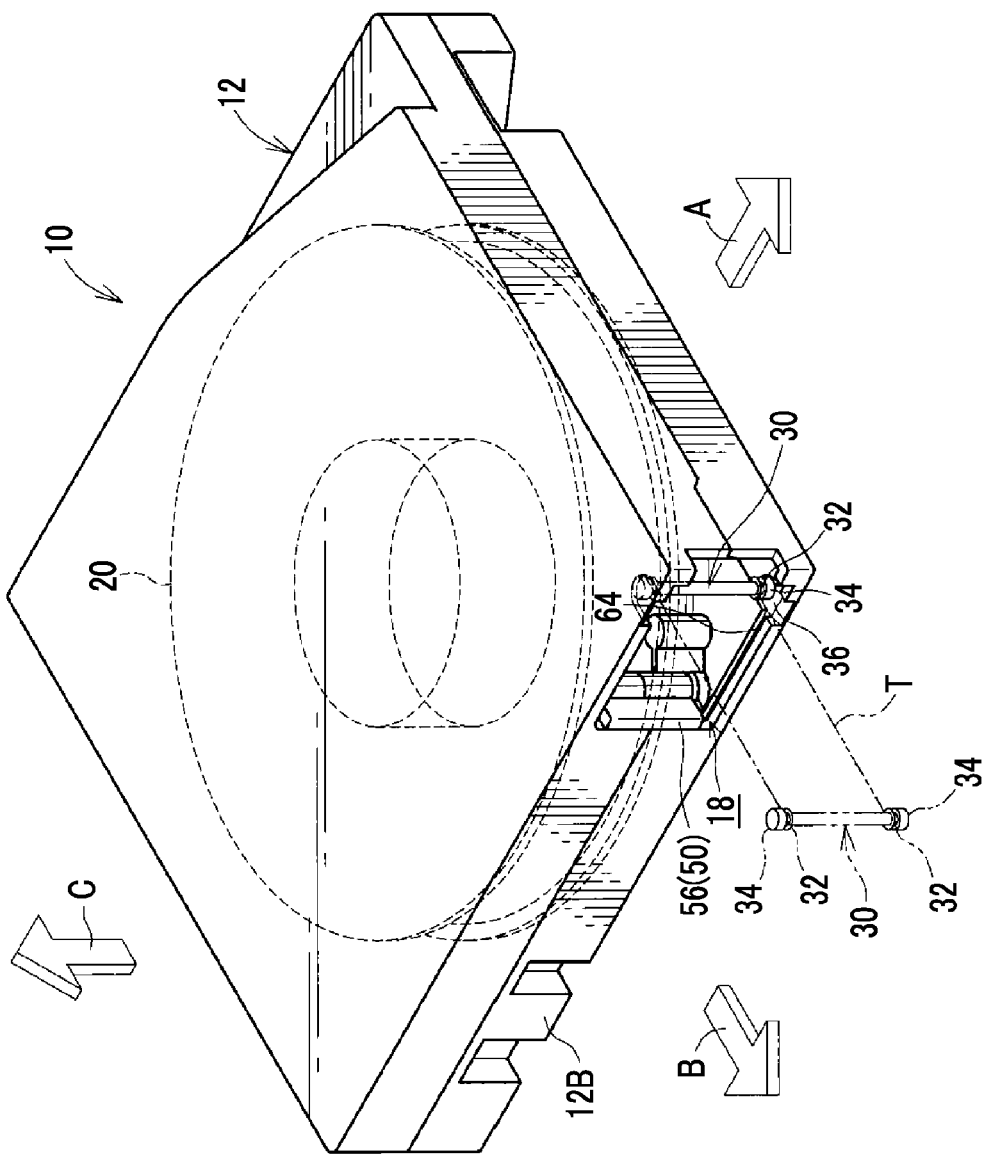
FIG. 1 is a perspective view of a recording tape cartridge according to an embodiment.

An embodiment of the invention will be described in detail below with reference to the drawings. For convenience of description, in FIG. 1, a direction in which the recording tape cartridge 10 is loaded into a drive device is indicated by an arrow A, and is referred to as a forward direction (front side) of the recording tape cartridge 10. Further, a direction of an arrow B orthogonal to the arrow A is referred to as a right direction (right side) of the recording tape cartridge 10. Further, a direction orthogonal to the direction of the arrow A and the direction of the arrow B is indicated by an arrow C and is referred to as an upward direction (upper side) of the recording tape cartridge 10.

As shown in FIGS. 1 to 5, the recording tape cartridge 10 includes a substantially rectangular box-shaped case 12. Upper and lower cases 14 and 16 made of a resin, such as polycarbonate (PC), are joined to each other by ultrasonic welding, screwing, or the like in a state in which a peripheral wall 14B standing at the peripheral edge of the top plate 14A and a peripheral wall 16B standing at the peripheral edge of a bottom plate 16A are in contact with each other. As a result, the case 12 is formed.

Only one reel 20 is rotatably housed in the case 12. A bottomed cylindrical reel hub 22 forming a shaft center portion and a lower flange 26 provided at the lower end portion of the reel hub 22 are molded integrally with each other, and an upper flange 24 is fixed to the upper end portion of the reel hub 22 by ultrasonic welding. As a result, the reel 20 is formed. Further, a recording tape T, such as a magnetic tape, serving as a data recording-reproducing medium is wound on the outer peripheral surface of the reel hub 22, and upper and lower end portions of the wound recording tape T in a width direction are protected by the upper and lower flanges 24 and 26, respectively.

Further, a reel gear 44 is formed in an annular shape on the lower surface of a bottom wall (bottom portion) 28 of the reel hub 22 (see FIG. 3), and a gear opening 40, which allows the reel gear 44 to be exposed to the outside, is formed at the central portion of the lower case 16. Since the reel gear 44, which is exposed from the gear opening 40, meshes with a drive gear 102 (see FIGS. 4 and 5) formed on a rotating shaft 100 of the drive device and is rotationally driven, the reel 20 is rotatable relative to the case 12 in the case 12.

Figure 3:
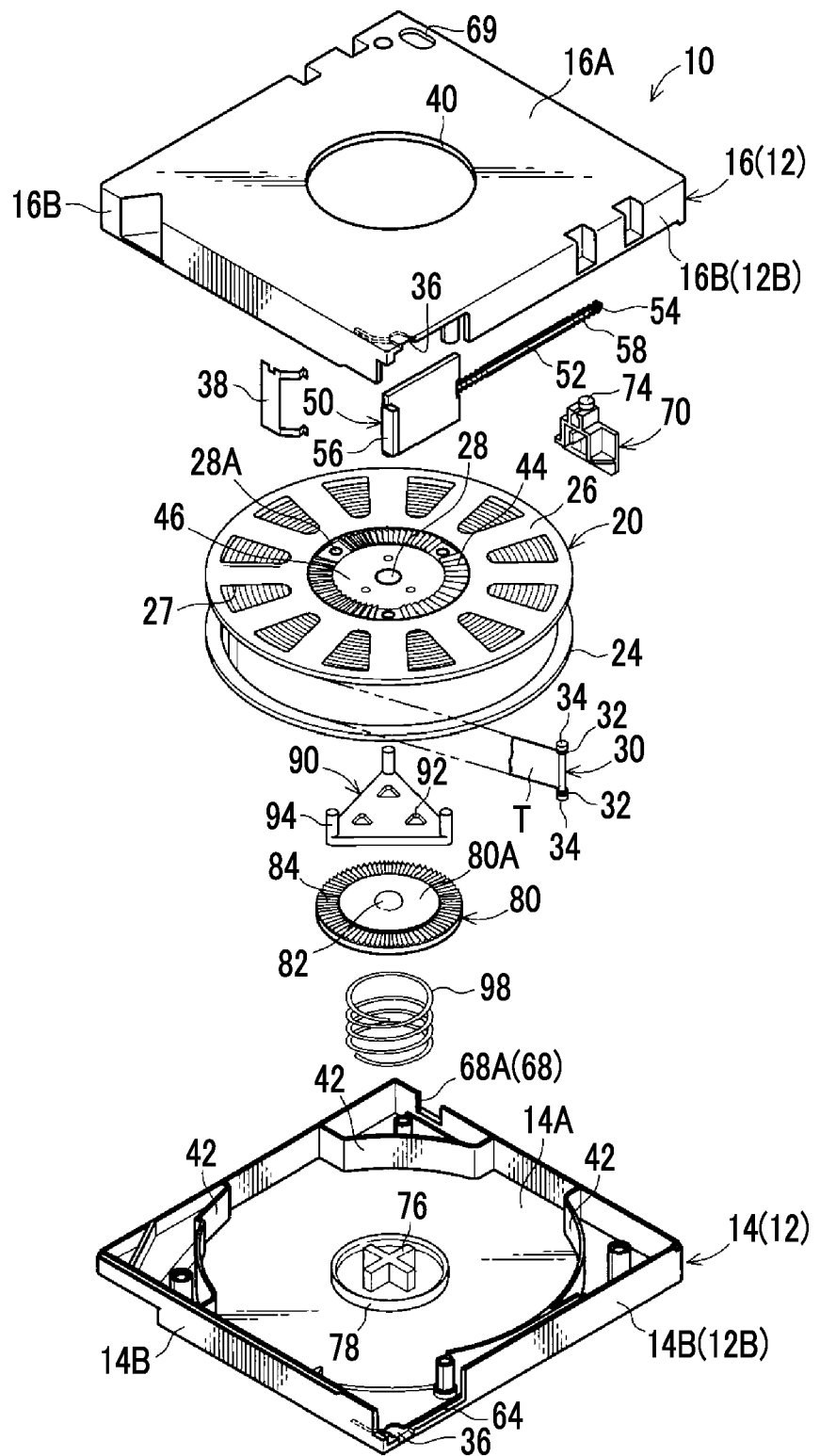
FIG. 3 is an exploded perspective view of the recording tape cartridge according to this embodiment seen obliquely from below.

Furthermore, a reel plate 46, which is an annular metal plate made of a magnetic material, is integrally fixed on the radially inside of the reel gear 44 of the lower surface of the bottom wall 28 by insert molding (see FIG. 3). The reel plate 46 is attracted and held by the magnetic force of an annular magnet (not shown) that is provided on the radially inside of the drive gear 102 of the rotating shaft 100 of the drive device in a radial direction.

Figure 2:
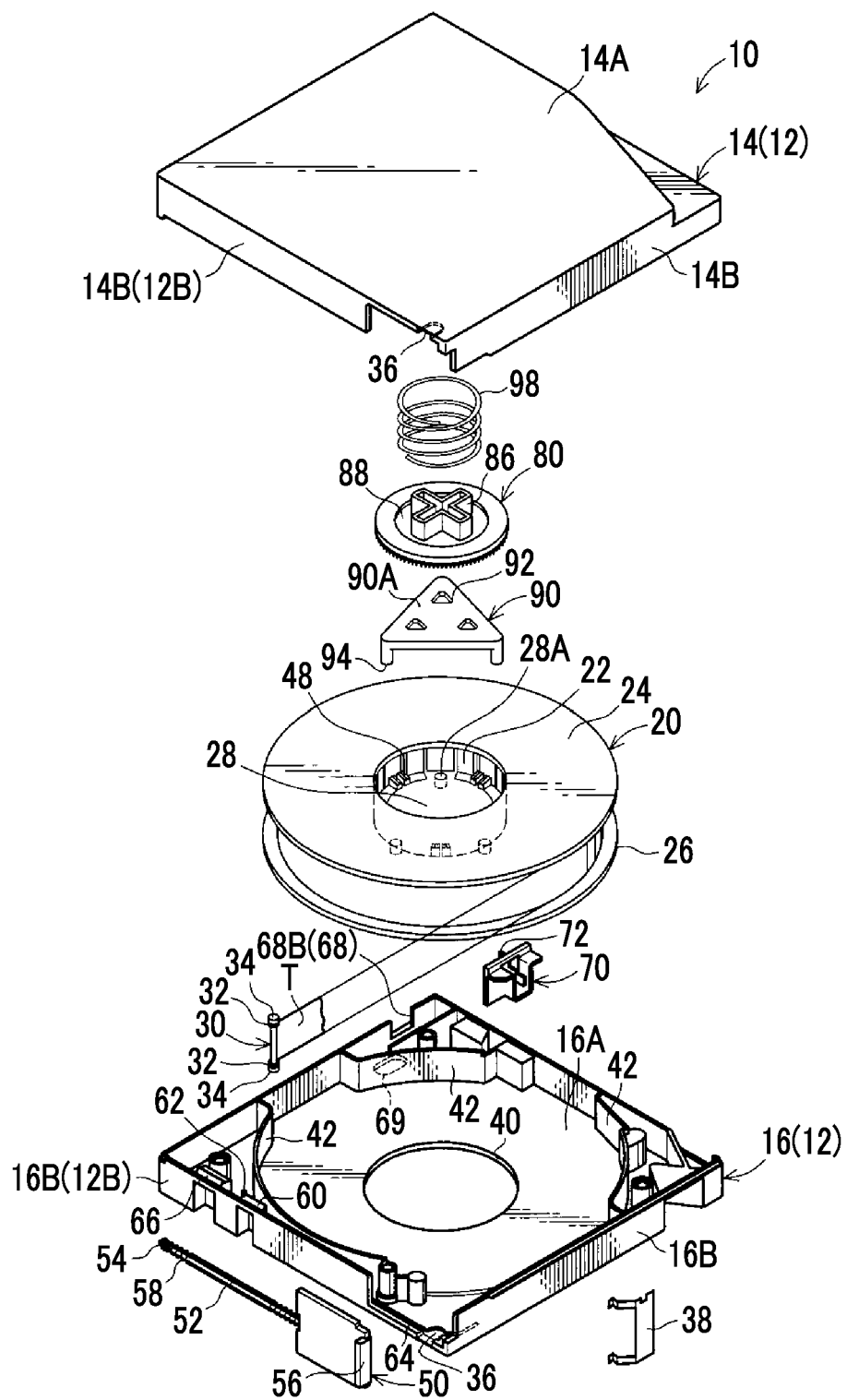
FIG. 2 is an exploded perspective view of the recording tape cartridge according to this embodiment seen obliquely from above.

Moreover, idling-regulation walls 42 serving as inner walls are partially provided so as to protrude from the inner surfaces of the upper and lower cases 14 and 16 along a circular locus coaxial with the gear opening 40 (see FIGS. 2 and 3). The reel 20 is held not to rock by the idling-regulation walls 42 when being not used (when being not loaded into the drive device, for example, when being stored, transported, and the like).

Further, an opening 18, which allows the recording tape T wound on the reel 20 to be led out, is formed at a right wall 12B of the case 12 (see FIG. 1). Furthermore, a leader pin 30 serving as a leader member, which is locked by a lead member (not shown) of the drive device and is led by the lead member, is fixed to a free end portion of the recording tape T led out of the opening 18. An annular groove 32 is formed between each of both end portions 34 of the leader pin 30 and each of both end portions of the recording tape T, which is fixed to the leader pin 30, in the width direction, and the annular grooves 32 are locked to hooks or the like of the lead member.

Furthermore, a pair of upper and lower pin holding portions 36, which positions and holds the leader pin 30 in the case 12, is formed on the inside of the opening 18 of the case 12, that is, on the inner surface of the top plate 14A of the upper case 14 and the inner surface of the bottom plate 16A of the lower case 16. Since the pin holding portions 36 have a substantially semicircular shape, of which the side to which the recording tape T is led out is opened, in plan view, both the end portions 34 of the leader pin 30 in an upright state can go in and out the pin holding portions 36 through the opened sides of the pin holding portions 36.

Moreover, a leaf spring 38 is disposed so as to be fixed near the pin holding portions 36; forked end portions of the leaf spring 38 are engaged with the both end portions 34 of the leader pin 30 in the upright state, respectively; and the leader pin 30 is held in the pin holding portions 36. When the leader pin 30 goes in and out the pin holding portions 36, the end portions of the leaf spring 38 are appropriately elastically deformed and allow the movement of the leader pin 30.

Further, as shown in FIGS. 1 to 3, the opening 18 of the case 12 is adapted to be opened and closed by a door 50. The door 50 is formed in the shape of a substantially rectangular plate having a size that allows the opening 18 to be closed, and groove portions 64 into which the upper and lower end portions of the door 50 can be slidably inserted are formed inside the opening 18 on the top plate 14A and the bottom plate 16A so that the door 50 can be moved along the right wall 12B of the case 12.

Furthermore, a shaft 52 is provided so as to protrude from the middle of the rear end portion of the door 50, and a coil spring 58 is fitted to the shaft 52. Moreover, an expansion portion 54, which prevents the coil spring 58 from being separated, is formed at the rear end of the shaft 52. Further, a support 60 including a locking portion 62, which locks the rear end of the coil spring 58 fitted to the shaft 52, is provided so as to protrude from the lower case 16 (see FIG. 2).

Accordingly, the shaft 52 is slidably supported on the support 60 and the rear end of the coil spring 58 is locked to the locking portion 62, so that the door 50 is adapted to be always biased in a direction in which the opening 18 is closed by the biasing force of the coil spring 58. It is preferable that a support 66 supporting the shaft 52 is further provided so as to protrude on the rear side of the support 60 when the opening 18 is opened.

Furthermore, a protruding portion 56, which is used to open and close the door, is provided at the front end portion of the door 50 so as to protrude to the outside (right side). The protruding portion 56 is adapted to be engaged with an engagement member (not shown) provided on the drive device as the recording tape cartridge 10 is loaded into the drive device. Accordingly, the door 50 is adapted to be opened against the biasing force of the coil spring 58.

Moreover, as shown in FIGS. 2 and 3, a writing protector 70, which allows data to be recordable or not to be recordable on the recording tape T, is provided at the left rear portion of the case 12 so as to be slidable in a lateral direction. Further, an opening 68 through which an operation protrusion 72 used to operate the writing protector 70 by a hand protrudes is formed at the rear wall of the case 12. The opening 68 is adapted to be formed by a notched portion 68A, which is formed at the peripheral wall 14B of the upper case 14, and a notched portion 68B, which is formed at the peripheral wall 16B of the lower case 16, when the upper and lower cases 14 and 16 are joined to each other.

Furthermore, an elongated hole 69 through which a protruding portion 74 of the writing protector 70 is exposed is formed at the bottom plate 16A of the lower case 16 so as to be elongated in the lateral direction. Accordingly, when the recording tape cartridge 10 is loaded into the drive device, the position of the protruding portion 74 of the writing protector 70 is detected in the drive device and whether or not data is recordable on the recording tape T is automatically determined. The protruding portion 74 does not protrude from the lower surface of the bottom plate 16A of the lower case 16.

Further, a plurality of (for example, three at an interval of 120°) engagement gears 48 stand at predetermined intervals (for example, at regular intervals) on the peripheral edge of the upper surface of the bottom wall 28 of the reel hub 22, and a plurality of (in this case, three at an interval of 120°) through holes 28A are formed at predetermined positions above the reel gear 44 between the engagement gears 48. Furthermore, a disc-shaped brake member 80, which is molded with a resin material, is provided on the radially inside of the reel hub 22.

A brake gear 84, which can mesh with the engagement gears 48, is formed in an annular shape on the peripheral edge of a lower surface 80A of the brake member 80, and an engagement protrusion 86, which has a substantially cross shape in plan view and into which a rotation regulating rib 76 is inserted, is formed on the upper surface of the brake member 80 so as to have a height slightly larger than the height of the rotation regulating rib 76. The rotation regulating rib 76 has a substantially cross shape in plan view and is provided so as to protrude downward from the inner surface of the top plate 14A of the upper case 14. Accordingly, the brake member 80 is not rotatable relative to the case 12 (the upper case 14), and is movable in a vertical direction on the radially inside of the reel hub 22.

Further, a compression coil spring 98 is provided between the upper case 14 and the brake member 80. That is, the compression coil spring 98 is provided in a state in which one end of the compression coil spring 98 is in contact with the inside of an annular protrusion 78 provided so as to protrude outside the rotation regulating rib 76 of the upper case 14 (a portion of the upper case 14 between the rotation regulating rib 76 and the annular protrusion 78) and the other thereof is in contact with the radially inside of an annular groove 88 provided on the upper surface of the brake member 80. The brake member 80 is always biased downward by the biasing force of the compression coil spring 98.

Accordingly, when the recording tape cartridge 10 is not loaded into the drive device, that is, when the recording tape cartridge 10 is not used, the brake gear 84 always meshes with the engagement gears 48 and a rotation lock state in which the rotation of the reel 20 relative to the case 12 is prevented is made. In this rotation lock state, the reel 20 is pushed toward the lower case 16 by the biasing force of the compression coil spring 98 and the reel gear 44 is exposed from the gear opening 40.

Furthermore, a release member 90, which is molded with a resin material and has a substantially equilateral-triangular shape in plan view, is provided on the radially inside of the reel hub 22 and below the brake member 80 (between the bottom wall 28 and the brake member 80). A plurality of through holes 92 having a predetermined shape are formed at appropriate positions on the release member 90 so that the weight of the release member 90 is reduced. Further, leg portions 94, which are inserted into the respective through holes 28A and protrude from the lower surface of the bottom wall 28 up to a predetermined height above the reel gear 44, are provided so as to protrude from the lower surface of the release member 90 at the respective vertex portions.

Furthermore, a substantially hemispherical release protrusion 82, which is provided so as to protrude from the center of the lower surface 80A of the brake member 80, comes into contact with the center of an upper surface 90A of the release member 90. Accordingly, since the contact area between the brake member 80 and the release member 90 is reduced, sliding friction is reduced when the recording tape cartridge is loaded into the drive device, that is, when the recording tape cartridge is used (when the reel 20 is rotated).

Here, the structure of the reel hub 22 and the lower flange 26 of the reel 20 will be described in more detail.

Figure 4:
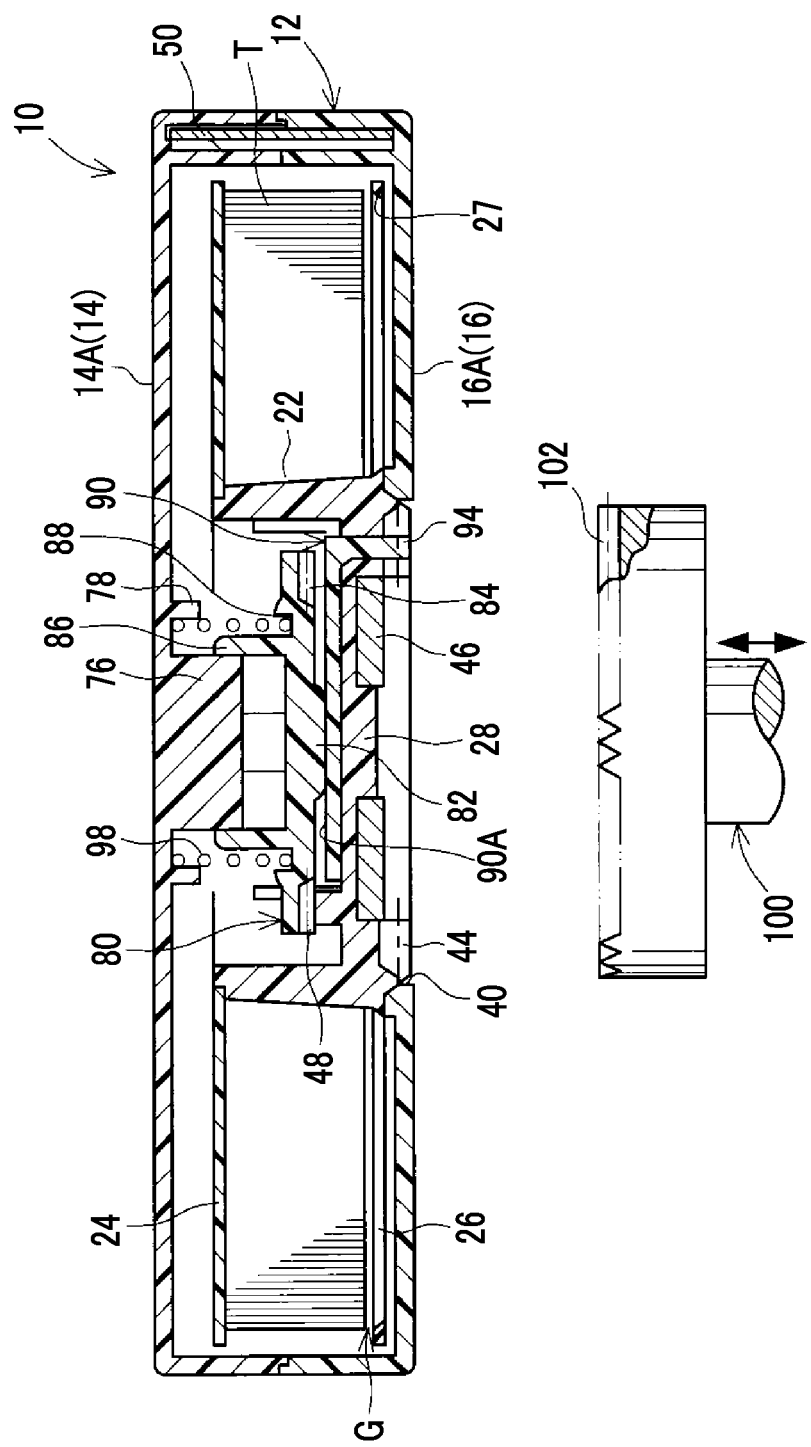
FIG. 4 is a cross-sectional view of the recording tape cartridge according to this embodiment with which a drive gear of a drive device does not yet mesh.
Figure 5:
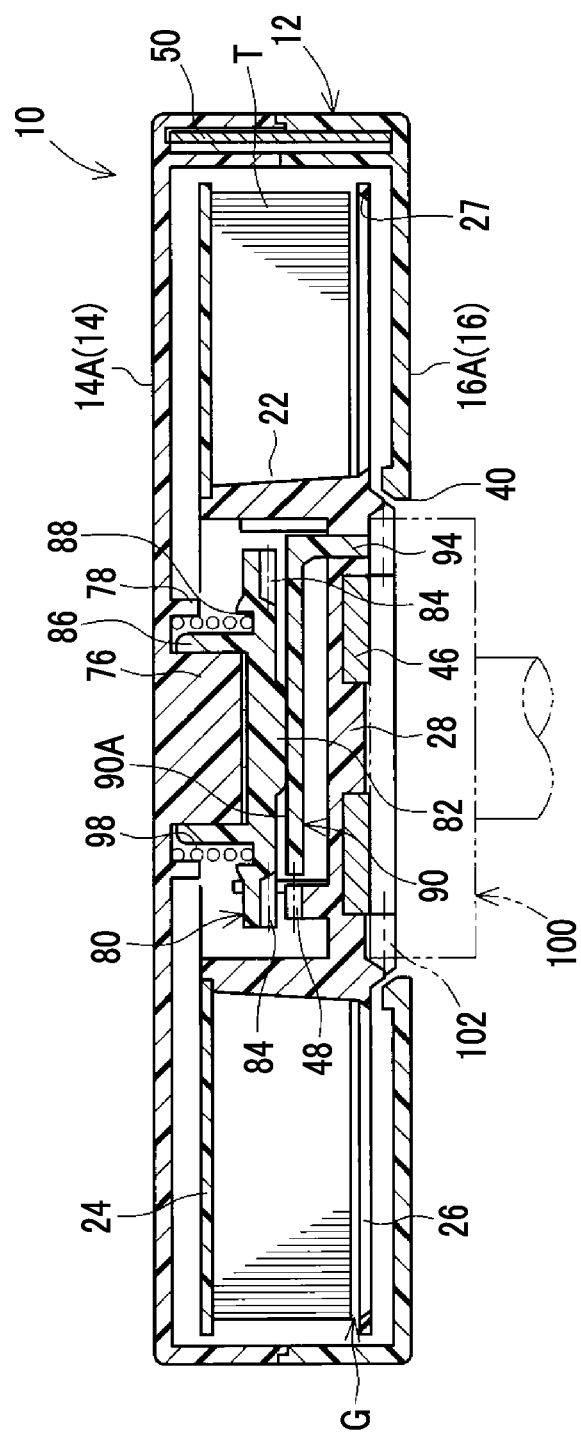
FIG. 5 is a cross-sectional view of the recording tape cartridge according to this embodiment with which the drive gear of the drive device has meshed.

As shown in FIGS. 4 and 5, the reel hub 22 is formed so that the outer diameter of the upper end portion of the reel hub 22 to which the upper flange 24 is welded is smaller than the outer diameter of the lower end portion of the reel hub 22 with which the lower flange 26 is formed integrally. More specifically, the reel hub 22 is formed in the shape of a substantially isosceles trapezoid of which the outer diameter is substantially linearly and gradually reduced toward an upper end portion from a lower end portion in side sectional view.

Accordingly, when the recording tape T is wound on the reel hub 22, the recording tape T is wound so that the upper end portion of the recording tape T in the width direction is along (is in contact with) the lower surface (inner surface) of the upper flange 24. That is, since a gap G is formed between the lower end portion of the recording tape T, which is wound on the reel hub 22, in the width direction and the upper surface (inner surface) of the lower flange 26, the lower end portion of the recording tape T in the width direction does not come into contact with the upper surface (inner surface) of the lower flange 26.

The upper flange 24 is made of, for example, a fiber-reinforced resin material in which carbon fiber or glass fiber is mixed with the same resin material as the material of the reel hub 22. Further, a plurality of through holes are not formed in the upper flange 24 formed in an annular shape, but a plurality of (for example, 12) through holes 27 are radially formed in the lower flange 26 as shown in FIG. 3.

Figure 6:
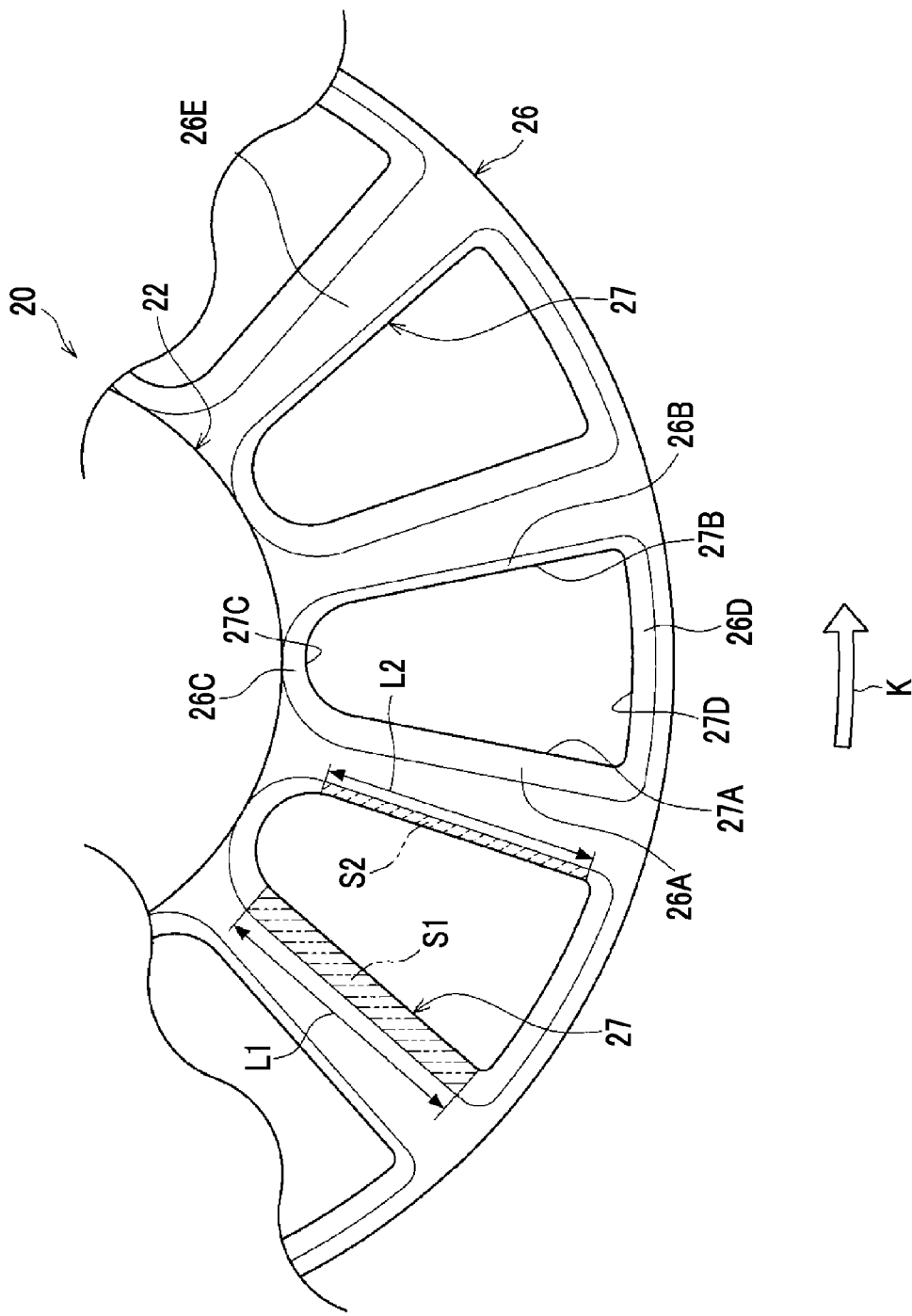
FIG. 6 is a partially enlarged plan view of a lower flange of a reel.
Figure 7A:
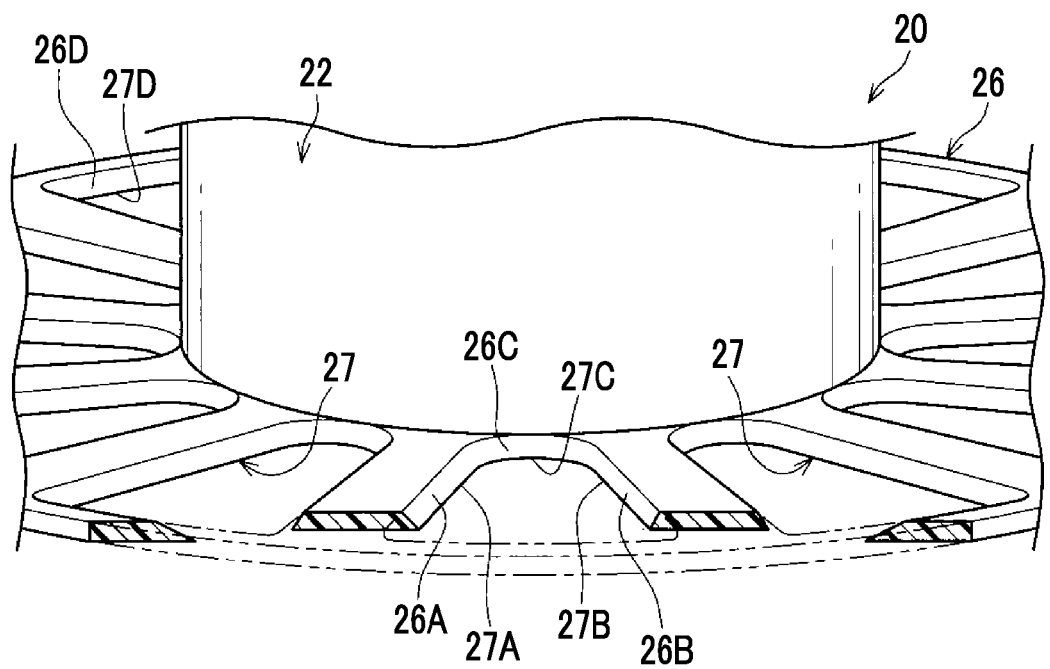
FIG. 7A is a partially enlarged perspective view of the lower flange of the reel.

As shown in FIG. 6, each of the through holes 27 is formed in the shape of a substantially isosceles triangle of which a vertex is a radially inner edge portion 27C in plan view, and an inclined surface 26C and an inclined surface 26D, which are inclined obliquely upward, are formed at the radially inner edge portion 27C and a radially outer edge portion 27D, respectively (also see FIG. 7A). A plurality of spoke portions 26E formed between the through holes 27 have the same shape.

Figure 7B:
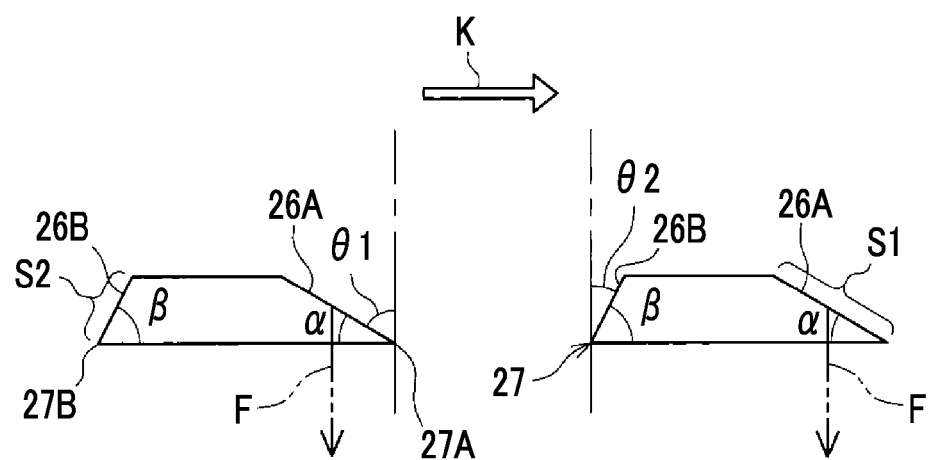
FIG. 7B is a cross-sectional view of a part of the lower flange of the reel taken in a circumferential direction.

Furthermore, as shown in FIGS. 6, 7A, and 7B, an inclined surface 26A and an inclined surface 26B, which are inclined obliquely upward, (which allow a distance between edge portions 27A and 27B in the circumferential direction on the lower surface to be shorter than that on the upper surface) are formed at one edge portion 27A and the other edge portion 27B, which are directed to the circumferential direction, (which extend in the radial direction) of each through hole 27.

The inclined surface 26A formed at one edge portion 27A is a surface directed to the rotational direction of the reel 20 (a direction indicated by an arrow K in FIGS. 6 and 7B) when the recording tape T is rewound on the reel 20, and the inclined surface 26B formed at the other edge portion 27B is a surface directed to the rotational direction of the reel 20 (a direction opposite to the arrow K) when the recording tape T is led out of the reel 20.

Further, an inclination angle α of the inclined surface 26A with respect to the surface of the reel 20, which is perpendicular to the direction of the rotation axis of the reel 20, is set to be smaller than an inclination angle β of the inclined surface 26B as shown in FIG. 7B. In other words, an inclination angle θ1 (=90°−α) of the inclined surface 26A with respect to the direction of the rotation axis of the reel 20 is set to be larger than an inclination angle θ2 (=90°−β) of the inclined surface 26B.

Furthermore, as shown in FIGS. 6 and 7B, the area S1 of the inclined surface 26A (the area of a region shown in FIG. 6 by virtual oblique lines) is set to be larger than the area S2 of the inclined surface 26B (the area of a region shown in FIG. 6 by virtual oblique lines). In the lower flange 26 of this embodiment, the length L1 of the inclined surface 26A in the radial direction and the length L2 of the inclined surface 26B in the radial direction are set to be substantially equal to each other.

The action of the recording tape cartridge 10 according to this embodiment in which one reel 20 including the reel hub 22 and the lower flange 26 having the above-mentioned structure is housed will be described below.

When data is to be recorded on the recording tape T or data recorded on the recording tape T is to be reproduced, the recording tape cartridge 10 is loaded into the drive device in the direction of the arrow A. Then, the engagement member provided on the drive device relatively moves the protruding portion 56 of the door 50 to the rear side against the biasing force of the coil spring 58. Accordingly, the opening 18 is opened.

Further, when the recording tape cartridge 10 is loaded into the drive device, the rotating shaft 100 relatively enters the case 12 from the gear opening 40 and the drive gear 102 meshes with the reel gear 44. Then, the leg portions 94, which protrude to the upper side of the reel gear 44, are pushed up against the biasing force of the compression coil spring 98, and the brake member 80 is pushed up through the release member 90. Accordingly, the meshing between the brake gear 84 and the engagement gears 48, that is, the rotation lock state is released.

Furthermore, in a state in which the drive gear 102 and the reel gear 44 mesh with each other, the reel plate 46 is attracted and held by the magnetic force of the annular magnet that is provided on the radially inside of the drive gear 102. Accordingly, the reel 20 is rotatable relative to the case 12 in the case 12 while the meshing between the reel gear 44 and the drive gear 102 is maintained.

The lead member provided on the drive device enters the case 12 from the opened opening 18, grips the leader pin 30, which is positioned and held in the pin holding portions 36, and leads the leader pin 30 out of the case 12. Since the rotation lock state is released at this time, the reel 20 is rotated with an operation for leading the leader pin 30 out.

In this way, the leader pin 30, which is led out of the case 12, is housed in a take-up reel (not shown). Further, when the take-up reel is rotationally driven, the take-up reel and the reel 20 are rotated in synchronization and the recording tape T is led out of the reel 20 while being wound on the take-up reel with tension. Then, the recording tape T comes into sliding contact with recording-reproducing heads (not shown) that are arranged along a predetermined tape path. Accordingly, data is recorded on the recording tape T or data recorded on the recording tape T is reproduced.

When the recording tape cartridge 10 in which data has been completely recorded on the recording tape T or data recorded on the recording tape T has been completely recorded is to be discharged from the drive device, the rotating shaft 100 is rotationally driven first in a direction opposite to a direction in which the recording tape T is led out. Accordingly, the reel 20 and the take-up reel are rotated in synchronization, and the recording tape T is rewound on the reel 20 with tension.

Incidentally, the inclined surfaces 26A and 26B are formed at one edge portion 27A and the other edge portion 27B of each of the through holes 27, which are formed in the lower flange 26 of the reel 20, respectively. For this reason, when the reel 20 is rotated, ascending air current is generated on the upper surface (inner surface) of the lower flange 26 by wind that is received by the inclined surface 26A or the inclined surface 26B.

More specifically, when the recording tape T is rewound on the reel 20, ascending air current is generated by wind that is received by the inclined surface 26A. When the recording tape T is led out of the reel 20, ascending air current is generated by wind that is received by the inclined surface 26B. Accordingly, when the reel 20 is rotated, a downward biasing force acts on the inclined surface 26A or 26B (in FIG. 7B, only biasing forces acting on the inclined surfaces 26A are shown by arrows F).

Here, since the inclination angle θ1 (=90°−α) of the inclined surface 26A with respect to the direction of the rotation axis of the reel 20 is set to be larger than the inclination angle θ2 (=90°−β) of the inclined surface 26B with respect to the direction of the rotation axis of the reel 20, the area S1 of the inclined surface 26A is set to be larger than the area S2 of the inclined surface 26B.

For this reason, the amount of the ascending air current, which is generated by the wind that is received by the inclined surface 26A when the recording tape T is rewound on the reel 20, is larger than the amount of the ascending air current, which is generated by the wind that is received by the inclined surface 26B when the recording tape T is led out of the reel 20. That is, a downward biasing force, which acts on the reel 20 when the recording tape T is rewound on the reel 20, is larger than a downward biasing force that acts on the reel 20 when the recording tape T is led out of the reel 20.

Accordingly, since the meshing between the reel gear 44 and the drive gear 102 when the recording tape T is rewound on the reel 20 is stronger than that when the recording tape T is led out of the reel 20, the rotational driving force of the drive gear 102 is efficiently transmitted to the reel gear 44. Therefore, the recording tape T is efficiently rewound on the reel 20 with tension.

Further, in a case in which the meshing between the reel gear 44 and the drive gear 102 is strong, even though the run-out of the lower flange 26 is increased since the plurality of through holes 27 are formed, the position of the reel 20 relative to the rotating shaft 100 can be stabilized when the recording tape T is rewound on the reel 20. Accordingly, the behavior of the traveling recording tape T can be stabilized (the rolling of the traveling recording tape T in the radial direction and the circumferential direction can be reduced).

It is preferable that a downward biasing force acting on the reel 20 is reduced as much as possible when the recording tape T is to be led out of the reel 20. That is, it is preferable that the inclination angle θ2 of the inclined surface 26B with respect to the direction of the rotation axis of the reel 20 is reduced as much as possible to make the meshing between the reel gear 44 and the drive gear 102 weak. According to this structure, it is easy for the reel 20 to rotate following the rotational drive of the take-up reel when the recording tape T is led out of the reel 20.

Furthermore, the reel hub 22 is formed in the shape of a substantially isosceles trapezoid of which the outer diameter of the upper end portion is substantially linearly and gradually reduced in comparison with the outer diameter of the lower end portion in side sectional view. Accordingly, when the recording tape T is wound on the reel hub 22, the recording tape T is wound so that the upper end portion of the recording tape T in the width direction is along (is in contact with) the lower surface (inner surface) of the upper flange 24.

That is, since the gap G is formed between the lower end portion of the recording tape T, which is wound on the reel hub 22, in the width direction and the upper surface (inner surface) of the lower flange 26, the lower end portion of the recording tape T in the width direction does not come into contact with the upper surface (inner surface) of the lower flange 26 (see FIGS. 4 and 5). Accordingly, even though the plurality of through holes 27 are formed in the lower flange 26, a damage to the lower end portion of the recording tape T in the width direction, which is caused by the contact between the lower end portion of the recording tape T and one edge portion 27A, the other edge portion 27B, the radially inner edge portion 27C, or the radially outer edge portion 27D of each through hole 27, is suppressed.

Further, since the lower flange 26 is molded integrally with the reel hub 22, the strength and stiffness of the lower flange 26 are more easily ensured than those of the upper flange 24. However, since the upper flange 24 according to this embodiment is made of a fiber-reinforced resin material and does not include a plurality of through holes similar to the plurality of through holes formed in the lower flange 26, the strength and stiffness of the upper flange 24 are sufficiently ensured. Accordingly, even though the recording tape T is wound so that the upper end portion of the recording tape T in the width direction is along (is in contact with) the lower surface (inner surface) of the upper flange 24 when the recording tape T is wound on the reel hub 22, the deformation (run-out) of the upper flange 24 is suppressed.

Since the recording tape T is wound so as to be along (be in contact with) the lower surface (inner surface) of the upper flange 24, there is also an effect of suppressing the deformation (run-out) of the upper flange 24 by the recording tape T. Furthermore, since the upper flange 24 is formed so as to include fiber, the upper flange 24 has appropriate surface roughness (for example, Ra≈0.8 μm). Accordingly, the sliding friction (friction) between the upper end portion of the recording tape T in the width direction and the upper flange 24 can be reduced. Therefore, the behavior of the traveling recording tape T can be further stabilized.

When the recording tape T is rewound on the reel 20 to the end, the leader pin 30 is held in the pin holding portions 36. Then, when the rotating shaft 100 is relatively separated from the gear opening 40, the meshing between the reel gear 44 and the drive gear 102 is released. Accordingly, the brake member 80 and the release member 90 are pressed downward by the biasing force of the compression coil spring 98, the leg portions 94 of the release member 90 are inserted into the through holes 28A of the bottom wall 28 and protrude from the lower surface of the bottom wall 28 up to a predetermined height above the reel gear 44, and the brake gear 84 meshes with the engagement gears 48.

Accordingly, the reel 20 is in the rotation lock state in which the relative rotation of the reel 20 in the case 12 is prevented. After that, the recording tape cartridge 10 is moved in a direction opposite to the direction of the arrow A by an ejector mechanism (not shown). As the recording tape cartridge 10 is moved, the door 50 slides in a direction in which the opening 18 is closed due to the biasing force of the coil spring 58 and closes the opening 18. Then, the recording tape cartridge 10 of which the opening 18 is closed is discharged from the drive device.

As described above, ascending air current is generated on the upper surface (inner surface) of the lower flange 26 by the wind that is received by the inclined surface 26A or the inclined surface 26B when the reel 20 is rotated. Accordingly, when the recording tape cartridge is loaded into the drive device, that is, when the recording tape cartridge is used, a cooling effect for the internal environment of the recording tape cartridge 10 can be expected other than the above-mentioned action.

Further, since the exposed area of the lower end portion of the recording tape T in the width direction can be increased by the plurality of through holes 27 even when the recording tape cartridge 10 is stored for a long time, an effect of cooling the recording tape T can be expected. Accordingly, since it is possible to ease an environmental condition when the recording tape cartridge 10 is stored for a long time, costs required to store the recording tape cartridge 10 for a long time can be reduced.

The recording tape cartridge 10 according to this embodiment has been described above with reference to the drawings. However, the recording tape cartridge 10 according to this embodiment is not limited to the recording tape cartridge shown in the drawings, and can be appropriately changed in design without departing from the scope of the invention. For example, the inclined surfaces 26A and 26B are not limited to inclined surfaces having a linear shape in the cross-sectional view of FIG. 7B, and may be formed in a curved shape (a bent shape or a wavy shape).

Furthermore, the shape of the through holes 27 is also not limited to the shape of a substantially isosceles triangle shown in the drawings. If the area S1 of the inclined surface 26A is not equal to or smaller than the area S2 of the inclined surface 26B, the shape of the through hole 27 may be substantially, for example, the shape of a right-angled triangle or an obtuse-angled triangle of which the length L1 of the inclined surface 26A in the radial direction is longer or shorter than the length L2 of the inclined surface 26B in the radial direction. Further, the inclination angle $\theta 1$ of the inclined surface 26A with respect to the direction of the rotation axis of the reel 20 and the inclination angle $\theta 2$ of the inclined surface 26B with respect to the direction of the rotation axis of the reel 20 may be equal to each other at this time.

Furthermore, the recording tape cartridge 10 is not limited to a structure that includes the leader pin 30 as a leader member, and may be adapted to include, for example, a leader tape (not shown) or a leader block (not shown). Moreover, the recording tape T has only to be understood as a long tape-shaped data recording-reproducing medium where data can be recorded and recorded data can be reproduced, and it goes without saying that the recording tape cartridge 10 can also be applied to any recording/reproducing type recording tape T.

What is claimed is:

1. A recording tape cartridge comprising:
    a single reel including
        a reel hub that is formed in a shape of a bottomed cylinder, of which an outer diameter of an upper end portion is smaller than an outer diameter of a lower end portion, the reel hub including an annular reel gear formed on a lower surface of a bottom portion and meshing with a drive gear of a drive device, and a recording tape being wound on an outer peripheral surface of the reel hub,
        a lower flange that is integrally formed at an outer side in a radial direction of the bottom portion and in which a plurality of through holes are formed so as to extend in the radial direction, a first inclined surface being formed at one edge portion and a second inclined surface being formed at another edge portion of each of the plurality of through holes, the one edge portion and the other edge portion being opposed and directed to lower flange circumferential directions, and the first inclined surface and the second inclined surface allowing a distance in the circumferential direction between the one edge portion and the other edge portion to be shorter at a lower surface of the lower flange than a distance in the circumferential direction between the one edge portion and the other edge portion at an upper surface of the lower flange, and
        an annular upper flange that is mounted at an upper end portion of the reel hub; and
    a case that houses the reel and in which an opening allowing the recording tape to be led out of the reel is formed,
    wherein an inclination angle of the first inclined surface of the one edge portion with respect to a bottom surface of the lower flange, the one edge portion being directed in a rotational direction of the reel when the recording tape is wound onto the reel, is smaller than an inclination angle of the second inclined surface of the other edge portion with respect to the bottom surface of the lower flange, the other edge portion being directed in a rotational direction of the reel when the recording tape is led out of the reel.

2. The recording tape cartridge according to claim 1, wherein the upper flange is made of a fiber-reinforced resin material.

3. A recording tape cartridge comprising:
    a single reel including
        a reel hub that is formed in a shape of a bottomed cylinder, of which an outer diameter of an upper end portion is smaller than an outer diameter of a lower end portion, the reel hub including an annular reel gear formed on a lower surface of a bottom portion and meshing with a drive gear of a drive device, and a recording tape being wound on an outer peripheral surface of the reel hub,
        a lower flange that is integrally formed at an outer side in a radial direction of the bottom portion and in which a plurality of through holes are formed so as to extend in the radial direction, a first inclined surface being formed at one edge portion and a second inclined surface being formed at another edge portion of each of the plurality of through holes, the one edge portion and the other edge portion being opposed and directed to lower flange circumferential directions, and the first inclined surface and the second inclined surface allowing a distance in the circumferential direction between the one edge portion and the other edge portion to be shorter at a lower surface of the lower flange than a distance in the circumferential direction between the one edge portion and the other edge portion at an upper surface of the lower flange, and
        an annular upper flange that is mounted at an upper end portion of the reel hub; and
    a case that houses the reel and in which an opening allowing the recording tape to be led out of the reel is formed,
    wherein an area of the first inclined surface of the one edge portion, the one edge portion being directed in a rotational direction of the reel when the recording tape is wound onto the reel, is larger than an area of the second inclined surface of the other edge portion, the other edge portion being directed in a rotational direction of the reel when the recording tape is led out of the reel.

4. The recording tape cartridge according to claim 3, wherein the upper flange is made of a fiber-reinforced resin material.

* * * * *